US012702882B2

(12) United States Patent
Gadonniex et al.

(10) Patent No.: US 12,702,882 B2
(45) Date of Patent: Aug. 11, 2026

(54) DETECTION DEVICE FOR A FIRE SAFETY SYSTEM

(71) Applicant: KIDDE FIRE PROTECTION, LLC, Bradenton, FL (US)

(72) Inventors: Dennis Gadonniex, Bradenton, FL (US); Paul Richardson, Riverview, FL (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 335 days.

(21) Appl. No.: 18/605,754

(22) Filed: Mar. 14, 2024

(65) Prior Publication Data

US 2024/0325809 A1 Oct. 3, 2024

Related U.S. Application Data

(60) Provisional application No. 63/492,621, filed on Mar. 28, 2023.

(51) Int. Cl.
*H04Q 1/30* (2006.01)
*A62C 37/40* (2006.01)
(Continued)

(52) U.S. Cl.
CPC ............ *A62C 37/40* (2013.01); *H01R 13/111* (2013.01); *H01R 35/04* (2013.01); *G08B 17/10* (2013.01)

(58) Field of Classification Search
CPC ...... A62C 37/40; H01R 13/111; H01R 35/04; H01R 13/02; H01R 31/08; G08B 17/10; G08B 25/045; G08B 17/113; G08B 17/06
(Continued)

(56) References Cited

U.S. PATENT DOCUMENTS 4,238,679 A * 12/1980 Macmillan ........... G08B 17/113
250/385.1
4,457,039 A * 7/1984 Massari .................. A46B 9/04
D4/110

(Continued)

FOREIGN PATENT DOCUMENTS

GB 2055236 A 2/1981

OTHER PUBLICATIONS

European Search Report for Application No. 24165316.1, Issued Oct. 2, 2024, 10 Pages.

*Primary Examiner* — Tai T Nguyen
(74) *Attorney, Agent, or Firm* — CANTOR COLBURN LLP

(57) ABSTRACT

A detection device includes a cover member adapted to support a detector assembly having a plurality of pins. A base member of the detection device is coupled to the cover member and, is adapted to accommodate a plurality of electrical terminals adapted to be engaged with the pins. The detection device includes a rotatable ring disposed on the base member and adapted to lock the cover member with respect to the base member. The detection device includes a plurality of shorting elements disposed on the rotatable ring and adapted to form a shorting contact with the electrical terminals. The rotatable ring is rotated with respect to the base member and the cover member to at least one of lock the cover member with respect to the base member and break the shorting contact, and unlock the cover member with respect to the base member and form the shorting contact.

20 Claims, 12 Drawing Sheets

(51) Int. Cl.
*H01R 13/11* (2006.01)
*H01R 35/04* (2006.01)
*G08B 17/10* (2006.01)

(58) Field of Classification Search
USPC .......................................................... 340/532
See application file for complete search history.

(56) References Cited

U.S. PATENT DOCUMENTS

| | | | | |
|---|---|---|---|---|
| 4,829,283 | A | 5/1989 | Spang et al. | |
| 6,160,487 | A * | 12/2000 | DeLuca ............... | G08B 17/113<br>340/693.11 |
| 6,288,647 | B1 | 9/2001 | Yamano | |
| 8,125,320 | B2 * | 2/2012 | Yamano ................. | G08B 17/00<br>340/384.1 |
| 2019/0297740 | A1 | 9/2019 | Kramer | |

* cited by examiner

DETECTION DEVICE FOR A FIRE SAFETY SYSTEM

CROSS-REFERENCE TO RELATED APPLICATION

This application claims the benefit of U.S. Provisional Patent Application No. 63/492,621 filed on Mar. 28, 2023, which is incorporated by reference herein in its entirety.

FIELD OF THE INVENTION

The disclosure relates to fire safety systems and more particularly, to a detection device for a fire safety system.

BACKGROUND

Commercial smoke detectors generally connect, electrically, to a centralized control panel in order to communicate with each other and with the centralized control panel in a network. For situations where electrical isolation is required, smoke detectors are generally installed into a base with a closed continuity switch. This switch is opened after detectors make contact. When a detector is removed, this continuity switch needs to be closed before the detector contacts are broken.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In one or more embodiments of the disclosure, a detection device is disclosed. The detection device includes a cover member defining a housing adapted to support a detector assembly having a plurality of pins. Further, the detection device includes a base member coupled to the cover member and adapted to accommodate a plurality of electrical terminals adapted to be engaged with the plurality of pins to form an electrical contact. The detection device includes a rotatable ring disposed on an outer periphery of the base member and adapted to lock the cover member with respect to the base member based on a rotation of the rotatable ring. Further, the detection device includes a plurality of shorting elements disposed on the rotatable ring and adapted to form a shorting contact with the plurality of electrical terminals based on the rotation of the rotatable ring. The rotatable ring is rotated with respect to the base member and the cover member to at least one of lock the cover member with respect to the base member and break the shorting contact between the plurality of electrical terminals and the plurality of shorting elements, and unlock the cover member with respect to the base member and form the shorting contact between the plurality of electrical terminals and the plurality of shorting elements.

In one or more embodiments, the cover member includes a peripheral wall vertically extending from a bottom surface of the cover member and adapted to be engaged with the rotatable ring.

In one or more embodiments, each of the plurality of pins extends through the bottom surface of the cover member.

In one or more embodiments, the peripheral wall includes a plurality of locking slots adapted to be engaged with the rotatable ring based on the rotation of the rotatable ring.

In one or more embodiments, the peripheral wall includes a plurality of guiding slots adapted to receive a plurality of protrusions formed on an inner circumferential surface of the base member.

In one or more embodiments, the rotatable ring includes a plurality of supporting portions and a plurality of engaging portions. The plurality of engaging portions extends laterally from the plurality of supporting portions. The plurality of engaging portions is adapted to be engaged with the plurality of locking slots to lock the cover member with respect to the base member based on the rotation of the rotatable ring.

In one or more embodiments, each of the plurality of supporting portions is adapted to support at least one of the plurality of shorting elements.

In one or more embodiments, each of the plurality of supporting portions includes a first wall extending orthogonally from an inner circumferential surface of the rotatable ring. Further, each of the plurality of supporting portions includes a second wall extending orthogonally from the first wall and adapted to support one of the plurality of shorting elements. A gap is defined between the second wall and the inner circumferential surface of the rotatable ring, and is adapted to receive at least a portion of the outer periphery of the base member.

In one or more embodiments, the rotatable ring includes a plurality of tabs protruding from the inner circumferential surface and adapted to be engaged with a plurality of slits formed on the outer periphery of the base member.

In one or more embodiments, each of the plurality of engaging portions extends laterally from the first wall and the second wall.

In one or more embodiments, the base member includes a plurality of mounting portions circumferentially distributed around a central opening of the base member. Each of the plurality of mounting portions is adapted to accommodate at least one of the plurality of electrical terminals.

In one or more embodiments, each of the plurality of electrical terminals includes a supporting portion adapted to be fastened to one of the plurality of mounting portions of the base member. Further, each of the plurality of electrical terminals includes a contact portion distal to the supporting portion and adapted to form the shorting contact with one of the plurality of shorting elements. Each of the plurality of electrical terminals includes an intermediate portion disposed between the supporting portion and the contact portion. The intermediate portion is adapted to be engaged with one of the plurality of pins.

In one or more embodiments, the contact portion includes a contact strip adapted to resiliently move to form the shorting contact with one of the plurality of shorting elements.

In one or more embodiments, the intermediate portion includes a pair of clamps adapted to resiliently expand with respect to each other to hold one of the plurality of pins therebetween.

In one or more embodiments, the rotatable ring is rotated between one of a first position and a second position opposite to the first position, when the plurality of pins forms the electrical contact with the plurality of electrical terminals.

In one or more embodiments, in the first position, the plurality of engaging portions locks the cover member with respect to the base member and, the contact strip of each of the plurality of electrical terminals moves away from each of the plurality of shorting elements to the break the shorting contact between the plurality of electrical terminal and the plurality of shorting elements. In the second position, the contact strip moves toward each of the plurality of shorting elements to form the shorting contact between the plurality of electrical terminal and the plurality of shorting elements, and unlocking the cover member with respect to the base member to remove the plurality of pins from the pair of clamps of the plurality of electrical terminals.

In one or more embodiment of the disclosure, a rotatable ring for a detection device is disclosed. The rotatable ring includes a body having an inner circumferential surface and an outer circumferential surface adapted to coincide with an outer periphery of a base member of the detection device. Further, the rotatable ring includes a plurality of supporting portions formed on the inner circumferential surface of the body and adapted to support a plurality of shorting elements. The rotatable ring includes a plurality of engaging portions extending laterally from one of the plurality of supporting portions. The plurality of engaging portions is adapted to be engaged with a cover member of the detection device to lock the cover member with respect to the base member. The rotatable ring is rotated with respect to the base member and the cover member to at least one of: lock the cover member with respect to the base member and break a shorting contact between the plurality of shorting elements and a plurality of electrical terminals positioned on the base member, and unlock the cover member with respect to the base member and form the shorting contact between the plurality of electrical terminals and the plurality of shorting elements.

In one or more embodiments, the rotatable ring includes a plurality of supporting portions and a plurality of engaging portions extending laterally from one of the plurality of supporting portions. The plurality of engaging portions is adapted to be engaged with a plurality of locking slots of the cover member to lock the cover member with respect to the base member based on the rotation of the rotatable ring.

In one or more embodiments, each of the plurality of supporting portions is adapted to support at least one of the plurality of shorting elements.

In one or more embodiments, each of the plurality of supporting portions includes a first wall extending orthogonally from the inner circumferential surface of the rotatable ring. Further, each of the plurality of supporting portions includes a second wall extending orthogonally from the first wall and adapted to support one of the plurality of shorting elements. A gap is defined between the second wall and the inner circumferential surface. The gap is adapted to receive at least a portion of the outer periphery of the base member.

To further clarify the advantages and features of the methods, systems, and apparatuses/devices, a more particular description of the methods, systems, and apparatuses/devices will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the invention will become better understood when the following detailed description is read with reference to the accompanying drawings in which like characters represent like parts throughout the drawings, wherein.

Figure 1:
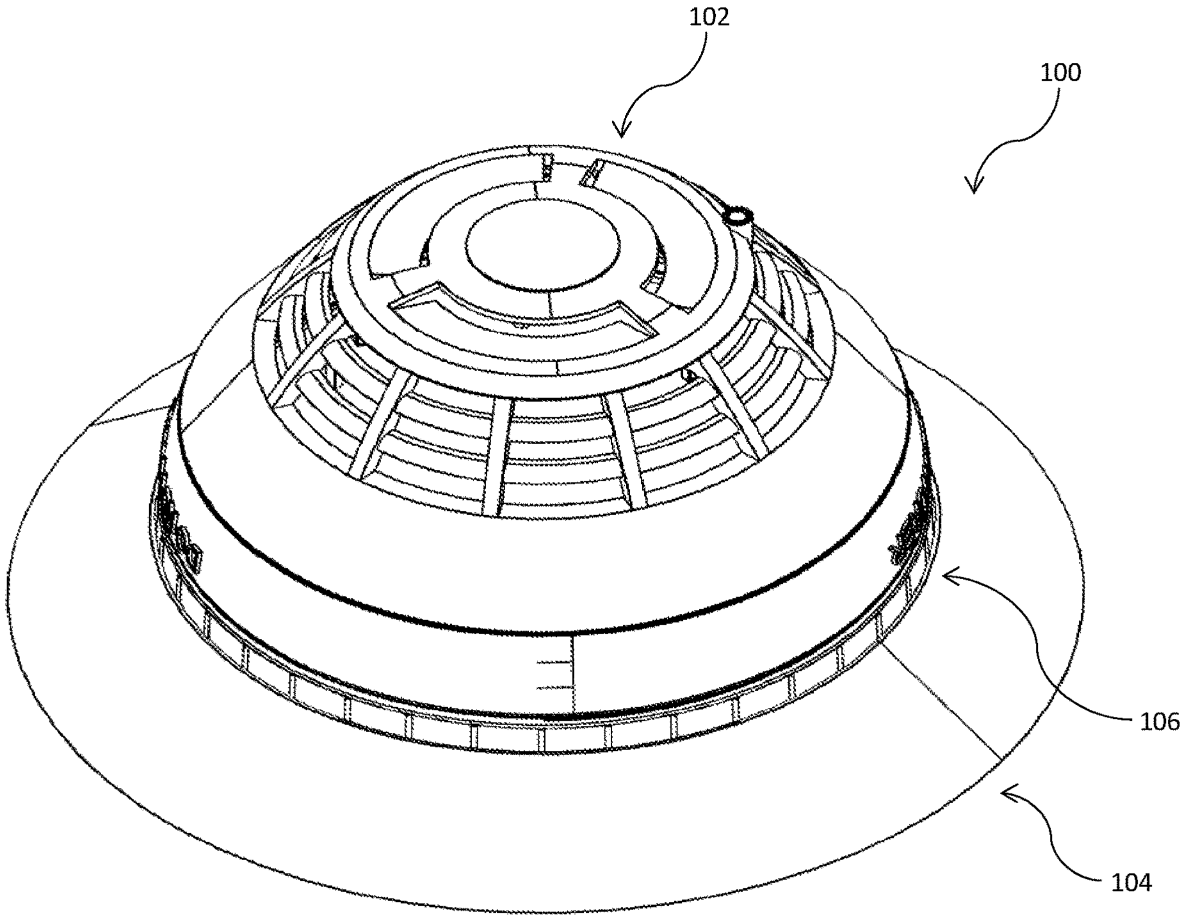
FIG. 1 illustrates an isometric view of a detection device for a fire safety system, according to one or more embodiments of the disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION OF FIGURES

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system and device, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to “an aspect”, “another aspect” or similar language means that a particular feature, structure, or characteristic described in connection with the embodiment is included in at least one embodiment of the disclosure. Thus, appearances of the phrase “in an embodiment”, “in another embodiment”, “some embodiments”, “one or more embodiments” and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Embodiments of the disclosure will be described below in detail with reference to the accompanying drawings.

Fire safety systems may be employed for monitoring air quality in an environment and suppressing any potential hazard which may lead to a fire. Such fire safety systems include various components, such as fire suppression systems, fire alarms, and a plurality of detectors used to detect the air quality in an enclosed space or a building to provide a warning or an alarm when smoke is present. The plurality of detectors is generally electrically connected to each other and to a centralized control panel of a fire safety system. For instance, the plurality of detectors is typically electrically connected in a loop configuration, with connecting wirings starting and finishing at the centralized control panel. In some instances, multiple loops may be connected to a single centralized control panel.

Currently, each of the plurality of detectors is provided with an isolator mechanism to electrically isolate such a detector from the loop configuration in case of any operational fault. Such an isolator mechanism ensures that a wiring segment with an operational fault is isolated from the rest of the wirings of the loop configuration. Further, the detector(s) that isolated the faulty wiring segment continues to operate normally. This prevents the faulty wiring segment from disabling the operation of other components of the fire safety system. Generally, the detector, having a detection element, contains a continuity switch that is normally in an open condition when the detection element is installed onto a base of the detector and closed when the detector element is removed from the base.

Therefore, in order to remove the detection element, the continuity switch is operated to a closed condition before removing the detection element from the base. This ensures that the detector can be removed while the rest of the fire safety system can remain operational. However, implementation of such a closed continuity switch may require a complex constructional design of the detector. This may increase the overall manufacturing cost of the detector.

Currently, the detectors are implemented with a single action mechanism to connect the detector and activate the continuity switch. For example, a single moving action may be used to connect the detector and activate the continuity switch. In order to implement the single action mechanism, the detectors are manufactured with tight tolerances with respect to sub-components of such detector. This results in a complex constructional design of the detector and increases the overall manufacturing cost of such a detector.

The disclosure provides a detection device for a fire safety system to eliminate one or more shortcomings associated with the abovementioned detectors. The detection device, as explained in the subsequent sections, eliminates the single moving action to connect the detector and activate the continuity switch. The detection device enables a detector to form a loop communication first and then break a continuity switch to deactivate such a switch. Similarly, the detection device enables activation of the continuity switch first and then breaks the connection of the detector from the loop communication. The detection device is designed and constructed in such a manner that the continuity switch function is separated from the detector to base connection function. By separating the motions for the continuity switch function and the detector to base connection function, the construction is simplified and does not depend on tight tolerancing to create a reliable design.

FIG. 1 illustrates an isometric view of a detection device 100 for a fire safety system, according to one or more embodiments of the disclosure. In one or more embodiments, the fire safety system may be employed to detect parameters, such as smoke, temperature, or other warning signs, associated with flammable elements, such as gases or any other flammable object present in a space and subsequently, a fire suppression system may be operated to extinguish flames arising from the flammable elements or prevent such flammable element from burning in a space based on the detection.

The fire safety system may include a plurality of detection devices, such as the detection device 100, mounted at various locations in an environment. In one or more embodiments, the plurality of detection devices may interchangeably be referred to as the detection devices 100. Further, the detection devices 100 may individually be referred to as the detection device 100. The detection device 100 may be adapted to detect parameters such as smoke, temperature, or other warning signs in such an environment. In an exemplary embodiment, the detection device 100 may be mounted on a roof of an enclosed space, such as a room. The detection devices 100 may be adapted to be in communication with each other and with a centralized control unit (not shown) of the fire safety system via a network.

In one embodiment, the detection device 100 may be embodied as a photoelectric detector, without departing from the scope of the disclosure. In another embodiment, the detection device 100 may be embodied as a combination of a temperature detector, a carbon dioxide detector, and a photoelectric detector, without departing from the scope of the disclosure. Referring to FIG. 1, the detection device 100 may include, but is not limited to, a cover member 102, a base member 104, and a rotatable ring 106.

Figure 2A:
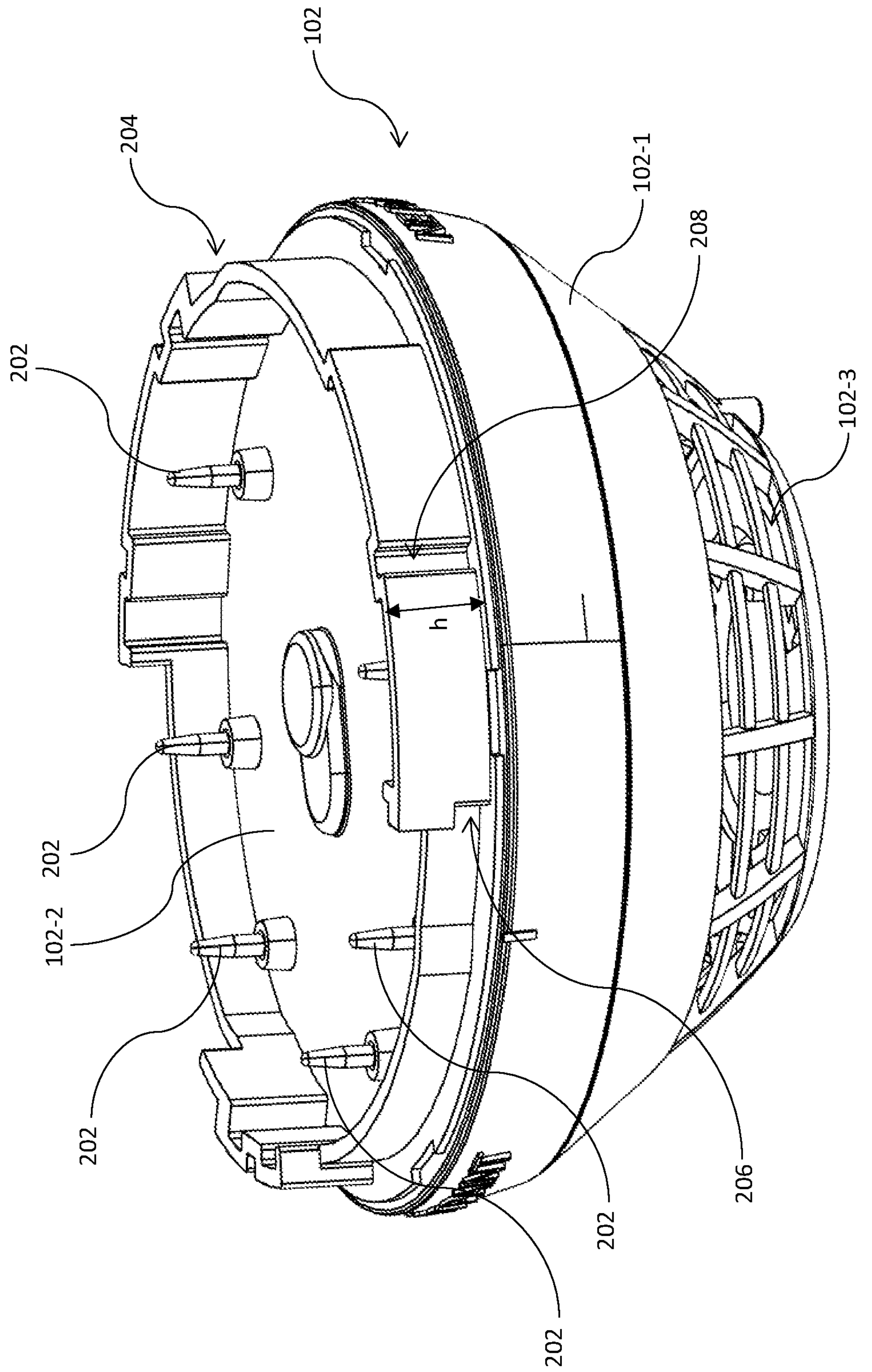
FIGS. 2*a* and 2*b* illustrate an isometric view and a bottom view, respectively, of a cover member of the detection device, according to one or more embodiments of the disclosure.
Figure 2B:
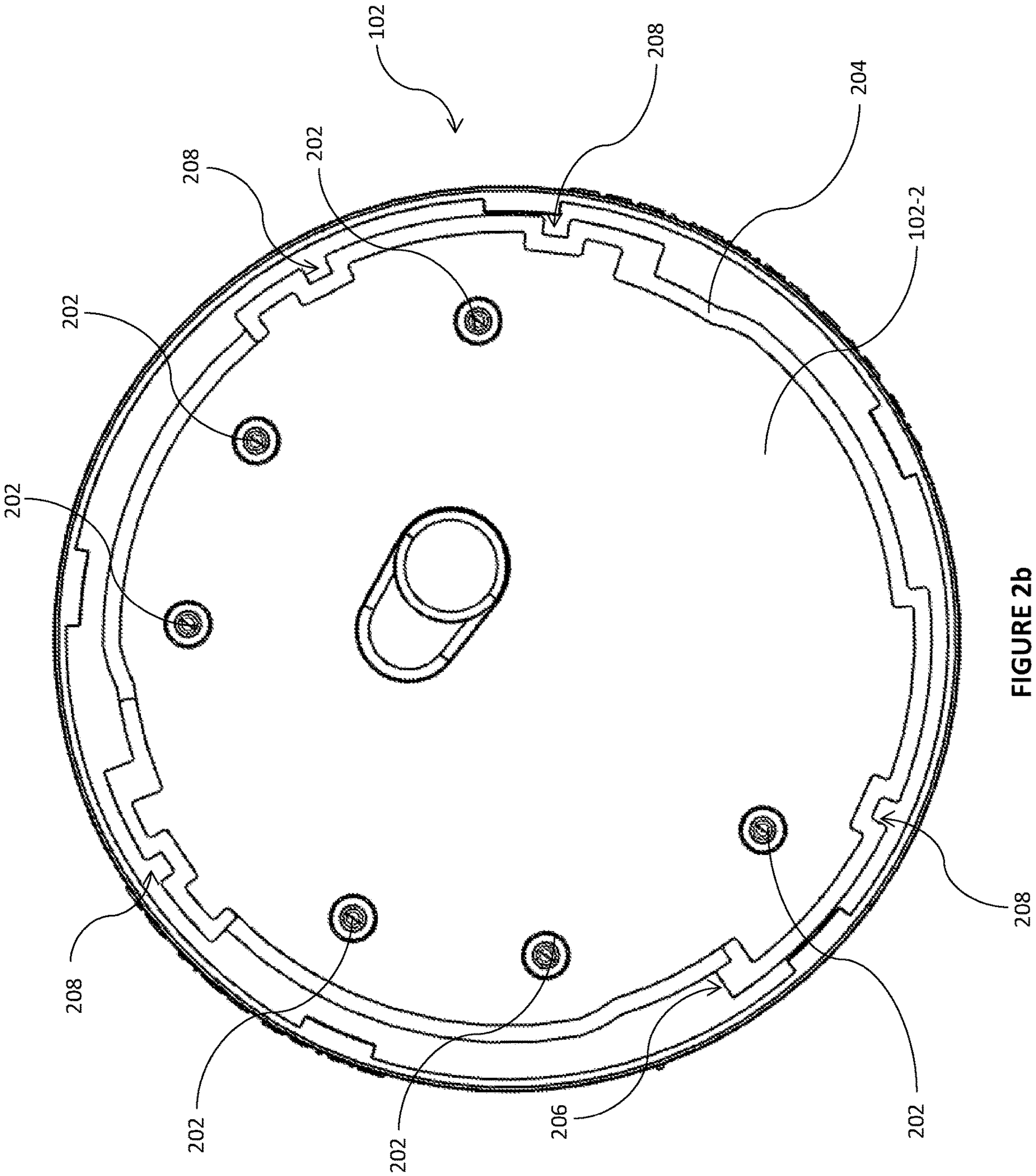

FIGS. 2*a* and 2*b* illustrate an isometric view and a bottom view, respectively, of the cover member 102, according to one or more embodiments of the disclosure. In one or more embodiments, the cover member 102 may be adapted to accommodate various sub-components, such as a detector assembly (not shown), of the detection device 100. In an exemplary embodiment, the detector assembly may include, but is not limited to, a smoke chamber, a sensing unit, and a circuit board, without departing from the scope of the disclosure.

Referring to FIGS. 2*a* and 2*b*, the cover member 102 may define a housing adapted to accommodate the detector assembly. The housing may be defined between an upper portion 102-1 of the cover member 102 and a bottom surface 102-2 of the cover member 102. In one or more embodiments, the detection device 100 may include, but is not limited to, a plurality of pins 202 connected to the sensing unit of the detector assembly. Each of the plurality of pins 202 may extend through the bottom surface 102-2 of the cover member 102.

The cover member 102 may include a plurality of openings 102-3 to allow smoke or gas to enter within the smoke chamber from the surrounding. The plurality of openings 102-3 may be formed on the upper portion 102-1 of the cover member 102. Further, the cover member 102 may include a peripheral wall 204 vertically extending from the bottom surface 102-2 of the cover member 102. The peripheral wall 204 may be adapted to be engaged with the rotatable ring 106 and the base member 104. In one or more embodiments, the peripheral wall 204 may include, but is not limited to, a plurality of locking slots 206 and a plurality guiding slots 208. In one or more embodiments, each of the plurality of guiding slots 208 may be embodied as a vertical slot extending along a height 'h' of the peripheral wall 204.

The plurality of guiding slots 208 may be adapted to be engaged with the base member 104. The plurality of guiding slots 208 may engage with the base member 104 to secure the cover member 102 to the base member 104 of the detection device 100. Further, the plurality of locking slots 206 may be adapted to be engaged with the rotatable ring 106 based on a rotation of the rotatable ring 106 which is explained in subsequent sections of the disclosure. The plurality of locking slots 206 may engage with the rotatable ring 106 to lock the movement of the cover member 102 with respect to the base member 104.

Figure 3:
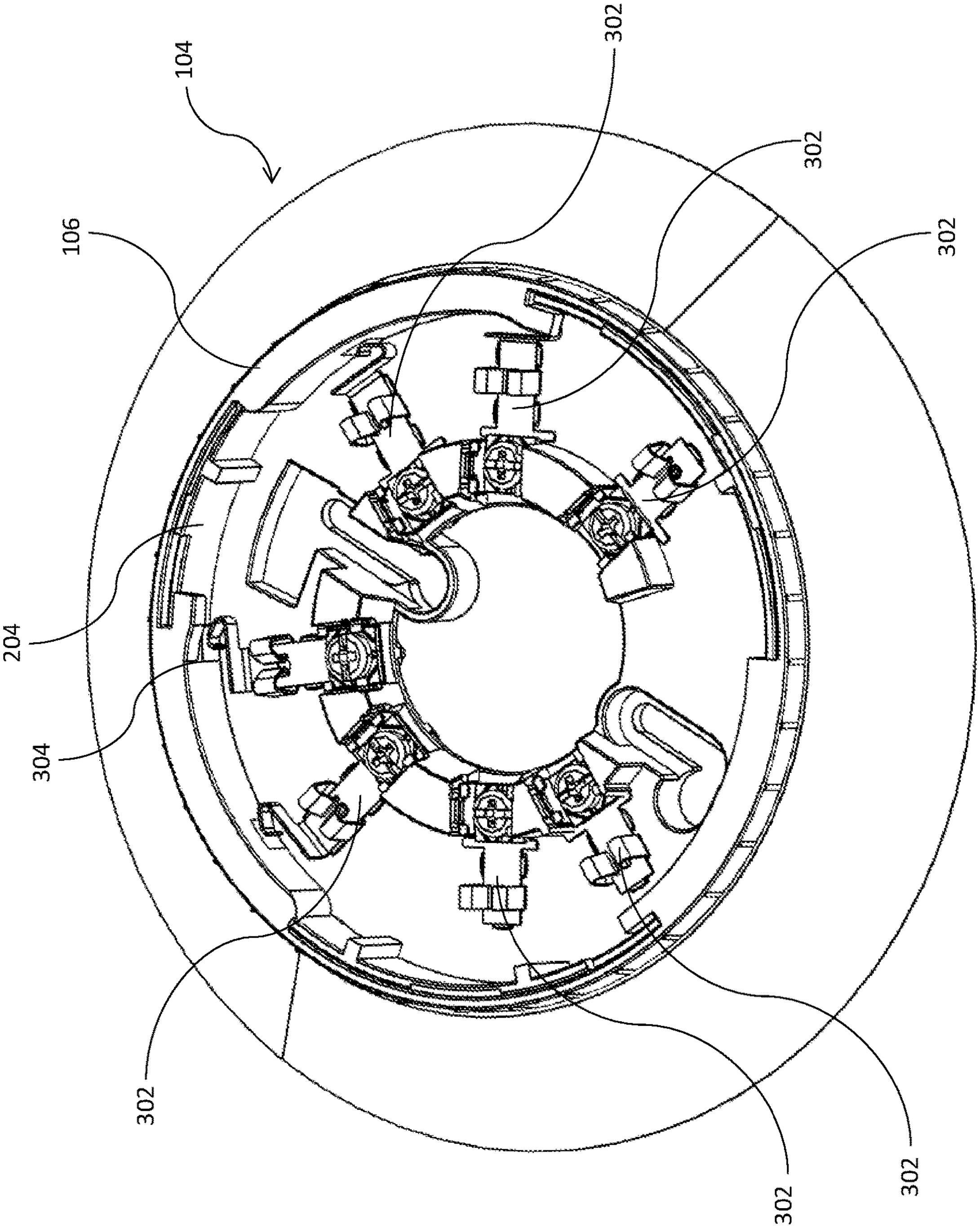
FIG. 3 illustrates a partial isometric view of the detection device depicting a base member and a rotatable ring of the detection device, according to one or more embodiments of the disclosure.
Figure 4:
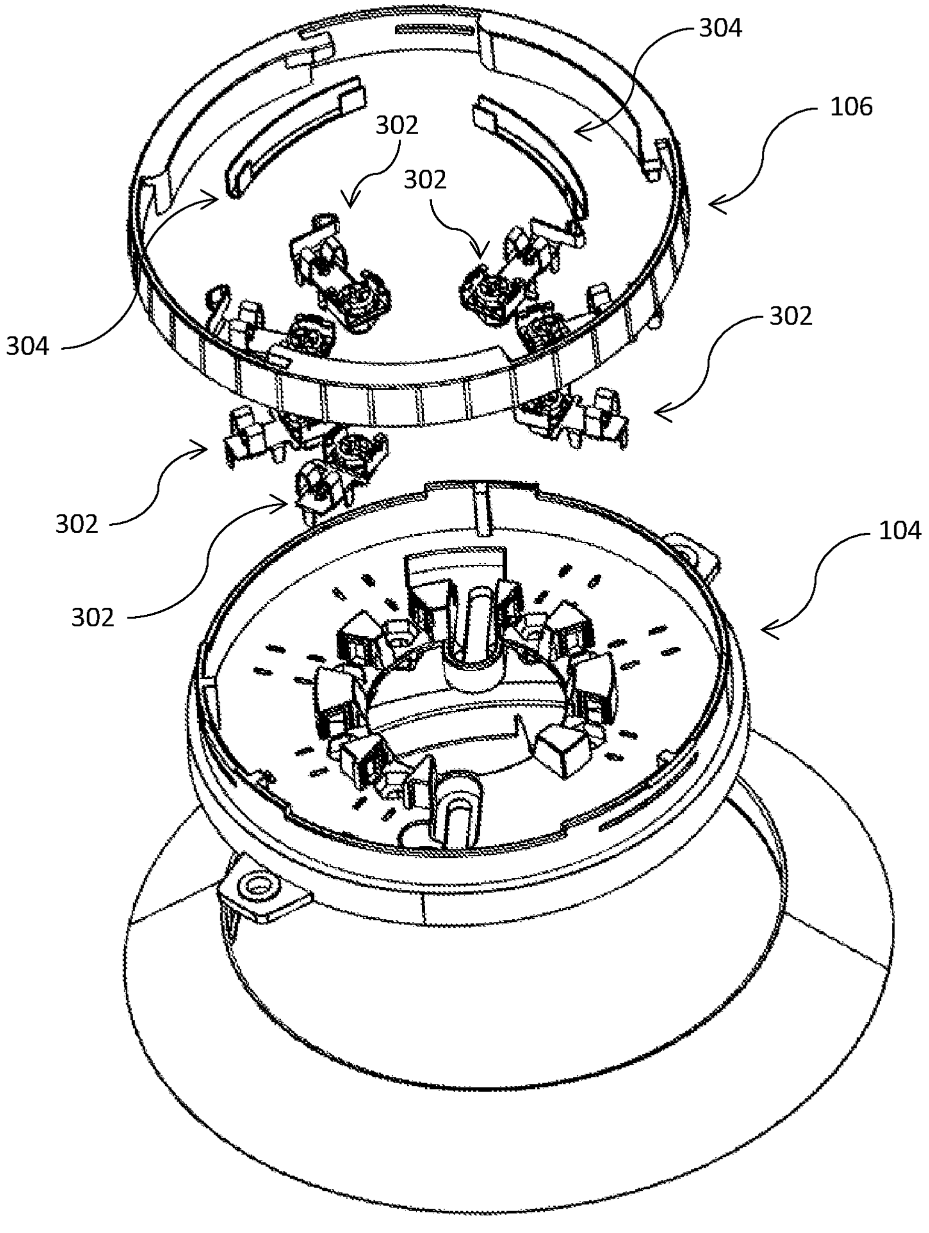
FIG. 4 illustrates an exploded view of the detection device depicting the base member and the rotatable ring, according to one or more embodiments of the disclosure.
Figure 5:
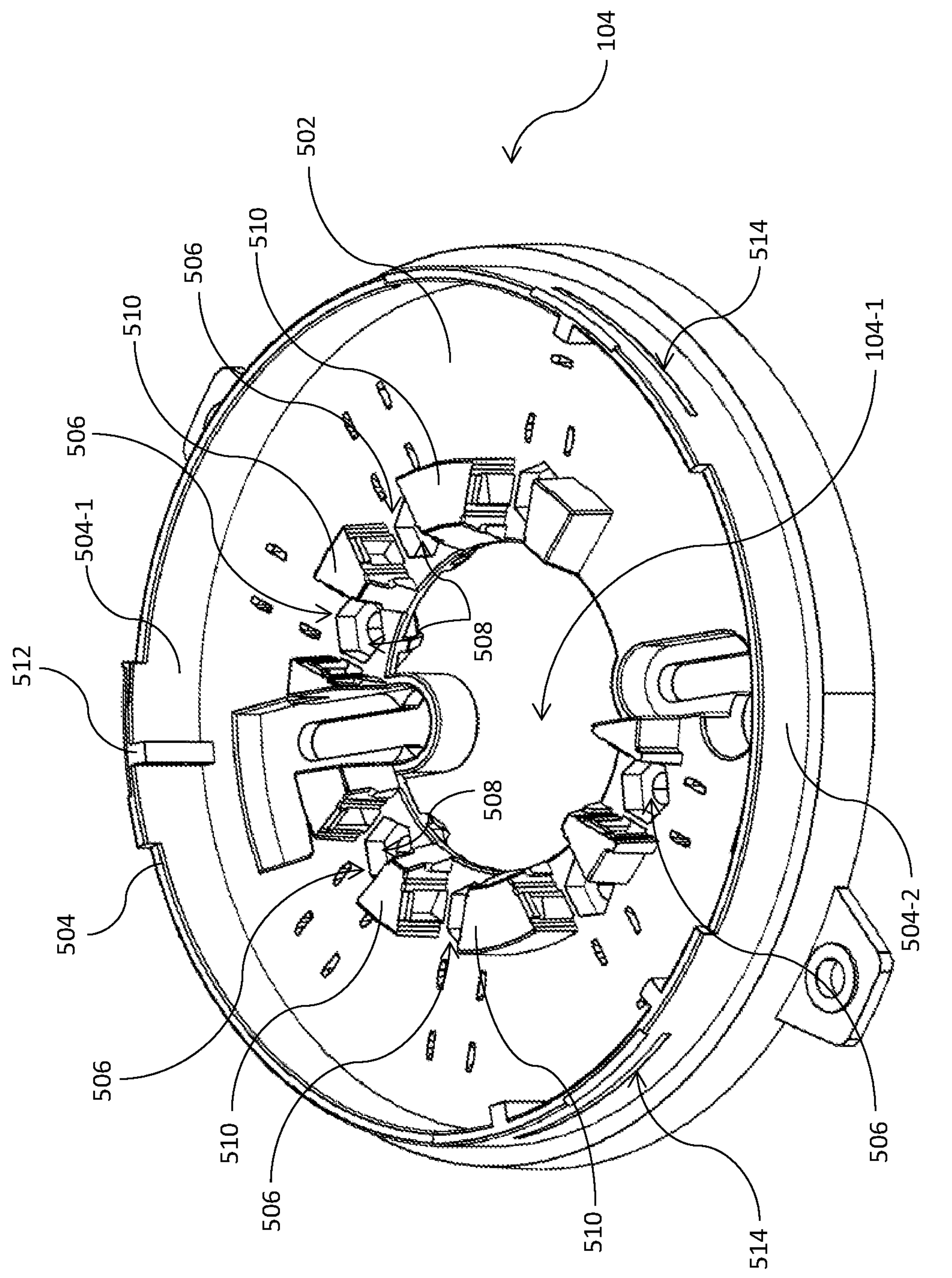
FIG. 5 illustrates an isometric view of the base member, according to one or more embodiments of the disclosure.

FIG. 3 illustrates a partial isometric view of the detection device 100 depicting the base member 104 and the rotatable ring 106 of the detection device 100, according to one or more embodiments of the disclosure. FIG. 4 illustrates an exploded view of the detection device 100 depicting the base member 104 and the rotatable ring 106, according to one or more embodiments of the disclosure. The base member 104 may be coupled to the cover member 102. FIG. 5 illustrates an isometric view of the base member 104, according to one or more embodiments of the disclosure. The base member 104 may be adapted to be mounted on a surface, such as a roof, via fastening members to support the detection device 100 on such a surface.

Referring to FIGS. 3, 4, and 5, in the illustrated embodiment, the base member 104 may include, but is not limited to, a supporting base 502 and an outer periphery 504 formed around the supporting base 502. The base member 104 may be adapted to accommodate a plurality of electrical terminals 302 adapted to be engaged with the plurality of pins 202 to form an electrical contact. In one or more embodiments, the detection device 100 may include a plurality of shorting elements 304 adapted to be disposed on the rotatable ring 106. Each of the plurality of shorting elements 304 may be adapted to form a shorting contact with the plurality of electrical terminals 302 based on a rotation of the rotatable ring 106. Constructional and operational details of the shorting elements 304 and the rotatable ring 106 are explained with respect to the description of FIGS. 8*a*-8*d* and FIGS. 9*a*-9*b* of the disclosure.

The base member 104 may include, but is not limited to, a plurality of mounting portions 506 circumferentially distributed around a central opening 104-1 of the base member 104. In the illustrated embodiment, the central opening 104-1 may be formed on the supporting base 502 to allow insertion of electrical wires (not shown) within the base member 104 and thereby, allow electrical connection of such wires to the plurality of electrical terminals 302. The plurality of mounting portions 506 may be formed on the supporting base 502. Each of the plurality of mounting portions 506 may be adapted to accommodate at least one of the plurality of electrical terminals 302. Each of the plurality of mounting portions 506 may include a groove 508 adapted to receive a fastener 702 (shown in FIG. 7) to fasten one of the plurality of the electrical terminals 302 and electrical wires to the base member 104.

Further, the supporting base 502 may include, but is not limited to, a plurality of mounting projections 510 circumferentially distributed around the central opening 104-1. The plurality of mounting projections 510 may be adapted to be engaged with the plurality of electrical terminals 302. In an exemplary embodiment, each of the plurality of mounting projections 510 may be snap-fitted with each of the plurality of electrical terminals 302 and thereby, securing such electrical terminal 302 within one of the plurality of mounting portions 506. In the illustrated embodiment, each of the plurality of mounting portions 506 may be defined between the adjacent mounting projections 510.

As mentioned earlier, referring to FIG. 5, the outer periphery 504 of the base member 104 may be formed around the supporting base 502. In one or more embodiments, the outer periphery 504 may interchangeably be referred to as the outer peripheral wall 504, without departing from the scope of the disclosure. In the illustrated embodiment, the outer peripheral wall 504 may include an inner circumferential surface 504-1 and an outer circumferential surface 504-2 distal to the inner circumferential surface 504-1.

Further, the outer peripheral wall 504 may include, but is not limited to, a plurality of protrusions 512 formed on the inner circumferential surface 504-1 and a plurality of slits 514 formed on the outer circumferential surface 504-2. The plurality of guiding slots 208 formed on the peripheral wall 204 of the cover member 102 may be adapted to receive the plurality of protrusions 512. In particular, the cover member 102 and the base member 104 may be attached to each other in a manner that the plurality of protrusions 512 may align with the plurality of guiding slots 208 and subsequently, slides within the plurality of guiding slots 208 to restrict relative rotational movement between the cover member 102 and the base member 104.

In one or more embodiments, the plurality of slits 514 may be adapted to be engaged with the rotatable ring 106 of the detection device 100. The rotatable ring 106 may be disposed on the outer peripheral wall 504 of the base member 104 in a manner that the plurality of slits 514 engages with the rotatable ring 106. In one or more embodiments, the rotatable ring 106 may be adapted to rotate around the outer peripheral wall 504 with respect to the plurality of slits 514. Each of the plurality of slits 514 may be adapted to restrict the rotation of the rotatable ring 106 beyond a predefined angle in a clockwise direction or an anti-clockwise direction.

Figure 6:
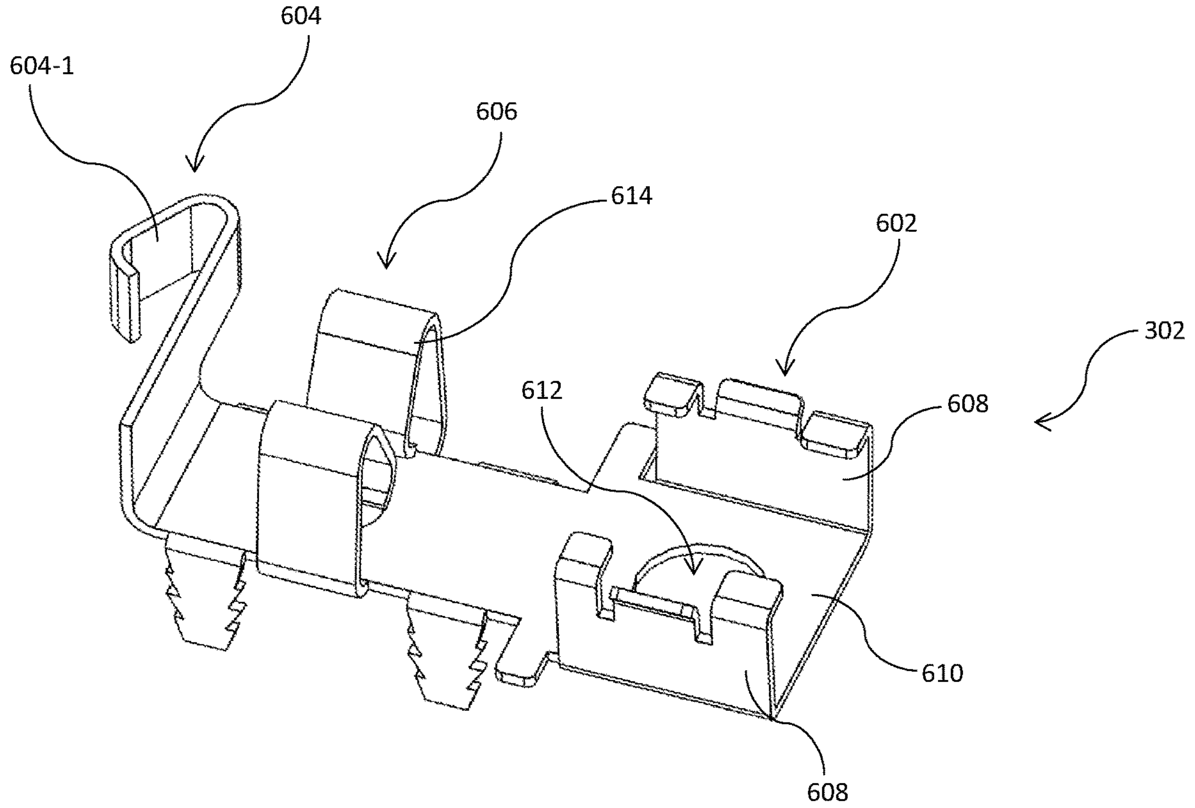
FIG. 6 illustrates an isometric view of one of a plurality of electrical terminals of the detection device, according to one or more embodiments of the disclosure.
Figure 7:
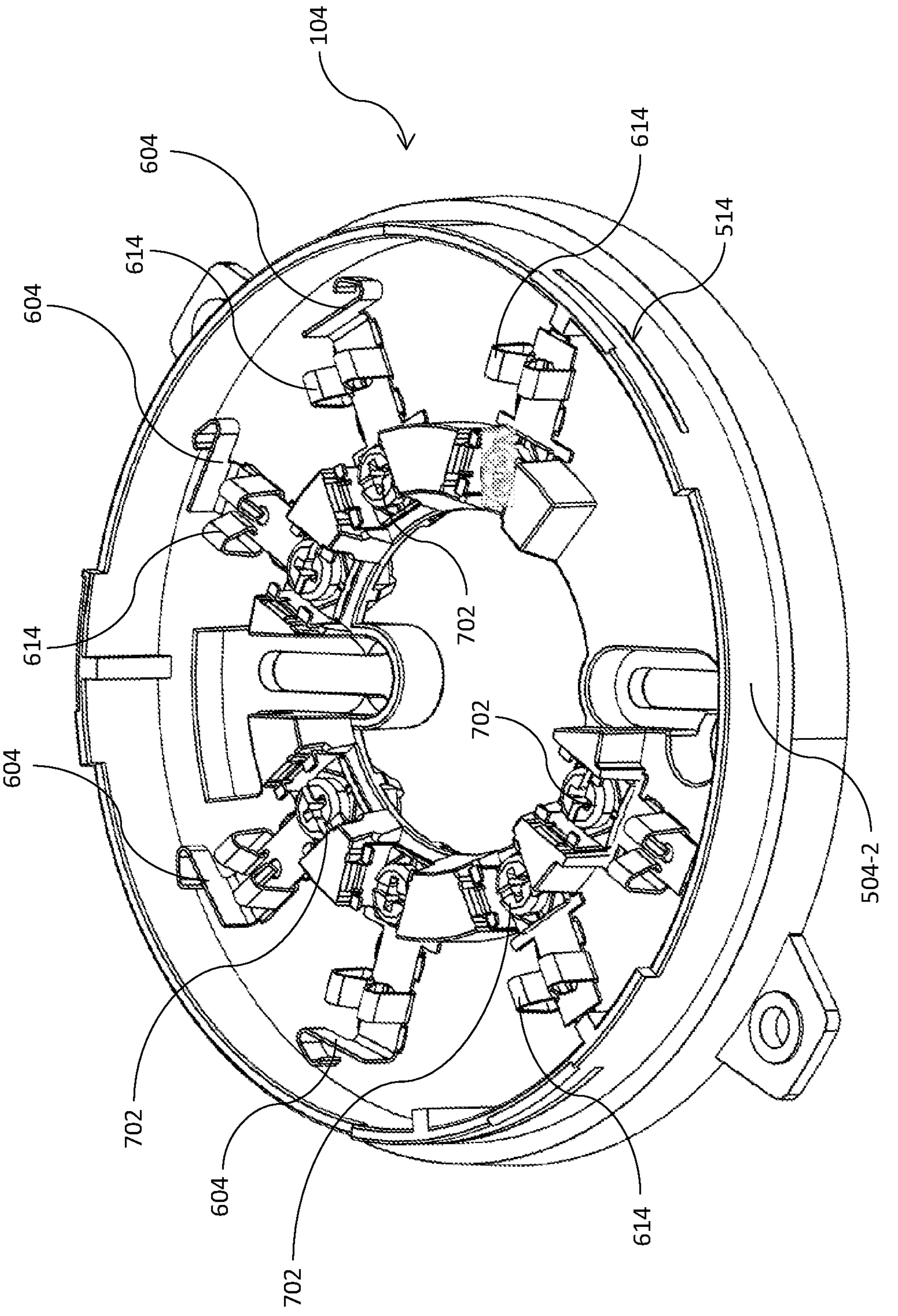
FIG. 7 illustrates an isometric view of the base member with the plurality of electrical terminals, according to one or more embodiments of the disclosure.

FIG. 6 illustrates an isometric view of one of the plurality of electrical terminals 302, according to one or more embodiments of the disclosure. FIG. 7 illustrates an isometric view of the base member 104 with the plurality of electrical terminals 302, according to one or more embodiments of the disclosure. Referring to FIGS. 6 and 7, each of the plurality of electrical terminals 302 may include, but is not limited to, a supporting portion 602, a contact portion 604 distal to the supporting portion 602, and an intermediate portion 606.

The supporting portion 602 may be adapted to be fastened to one of the plurality of mounting portions 506 of the base member 104. In the illustrated embodiment, the supporting portion 602 may include, but is not limited to, a pair of vertical walls 608 and a horizontal wall 610 disposed between the pair of vertical walls 608. Each of the pair of vertical walls 608 may be adapted to be engaged with one of the plurality of mounting projections 510 of the base member 104. Further, the horizontal wall 610 may be adapted to be aligned to the one of the plurality of mounting portions 506 of the base member 104.

The pair of vertical walls 608 may be engaged with adjacent mounting projections 510 in a manner that the horizontal wall 610 aligns to one of the plurality of mounting portions 506 defined therebetween. In the illustrated embodiment, the horizontal wall 610 may include a groove 612 adapted to be aligned with the groove 508 of one of the plurality of mounting portions 506. The fastener 702 may be inserted through the groove 612 of the horizontal wall 610 and the groove 508 of one of the plurality of mounting portions 506 to fasten the electrical terminal 302 to one of the plurality of mounting portions 506.

Further, the intermediate portion 606 of each of the electrical terminals 302 may be disposed between the supporting portion 602 and the contact portion 604. The intermediate portion 606 may be adapted to be engaged with one of the plurality of pins 202 extending from the bottom surface 102-2 of the cover member 102. The intermediate portion 606 may engage with one of the plurality of pins 202 to form the electrical contact between the sensing unit and one of the plurality of electrical terminals 302. In the illustrated embodiment, the intermediate portion 606 may include a pair of clamps 614 adapted to resiliently expand with respect to each other to hold one of the plurality of pins 202 therebetween. In particular, the cover member 102 may be attached to the base member 104 in a manner that each of the plurality of pins 202 resiliently expands the pair of clamps 614 of the respective electrical terminal 302 and held between the pair of clamps 614 to form the electrical contact therebetween.

Referring to FIGS. 4 and 7, the contact portion 604 of each of the electrical terminals 302 may be adapted to form the shorting contact with one of the plurality of shorting elements 304. In one or more embodiments, the contact portion 604 may include a contact strip 604-1 adapted to resiliently move to form the shorting contact with one of the plurality of shorting elements 304. In the illustrated embodiment, the contact strip 604-1 may be embodied as U-shaped strip having a first end attached to the intermediate portion 606 of the electrical terminal 302 and a second end adapted to from the shorting contact with one of the plurality of shorting elements 304.

The contact portion 604 may form the shorting contact with one of the plurality of shorting elements 304 based on the rotation of the rotatable ring 106. When the rotatable ring 106 is rotated in one of the clockwise direction and the anti-clockwise direction, then the contact portion 604 of each of the electrical terminals 302 may form the shorting contact with one of the plurality of shorting elements 304. Owing to such shorting contact, the plurality of pins 202 of the sensing unit of the detection device 100 may be electrically isolated from the centralized control panel of the fire safety system and thereby, isolating the detector assembly from the centralized control panel.

Similarly, when the rotatable ring 106 is rotated in one of the clockwise direction and the anti-clockwise direction, then the contact portion of each of the electrical terminals 302 may break the shorting contact with one of the plurality of shorting elements 304. Owing to such breaking of the shorting contact, the plurality of pins 202 of the sensing unit of the detection device 100 may be electrically connected to the centralized control panel of the fire safety system and thereby, electrically connecting the detector assembly to the centralized control panel.

Figure 8A:
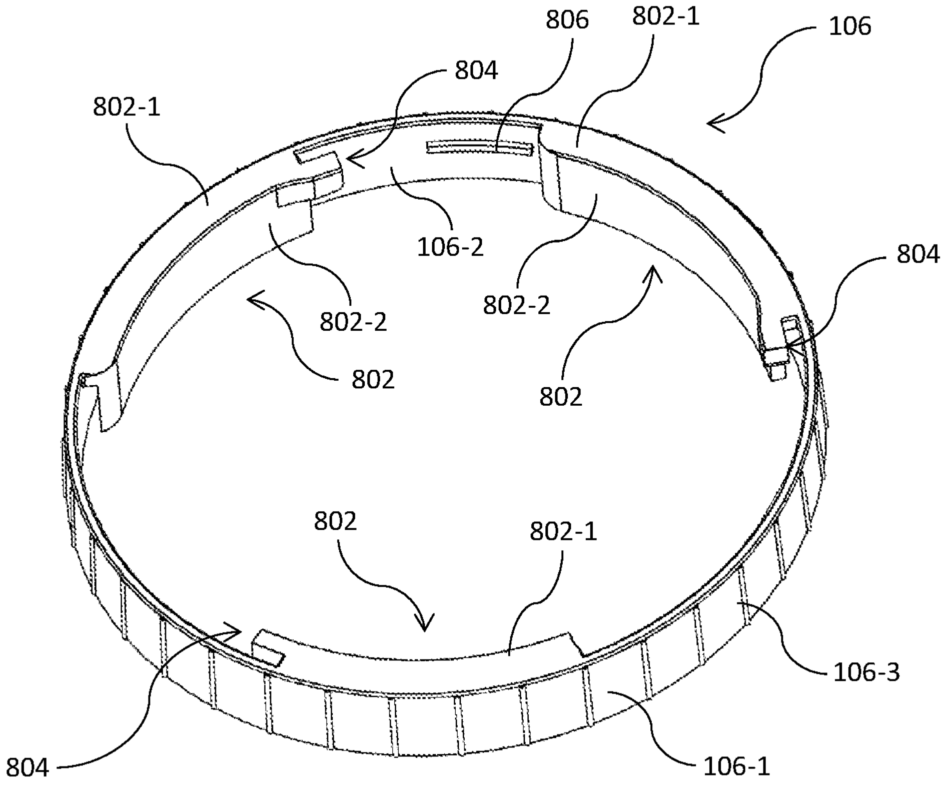
FIGS. 8*a* and 8*b* illustrate different isometric views of the rotatable ring, according to one or more embodiments of the disclosure.
Figure 8B:
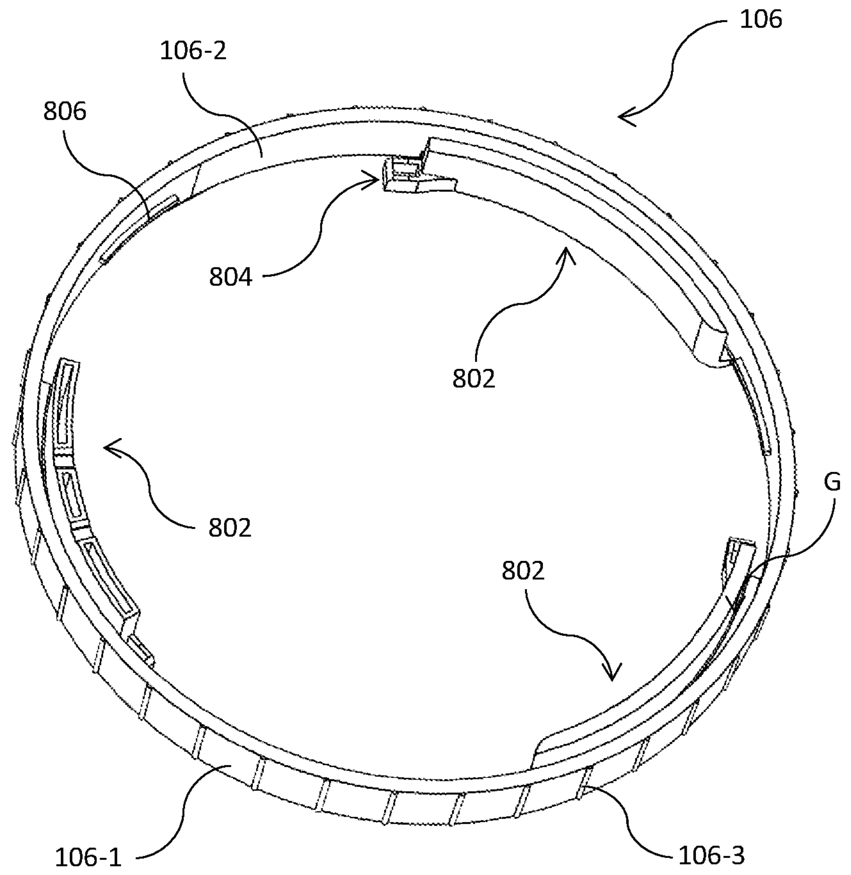
Figure 8C:
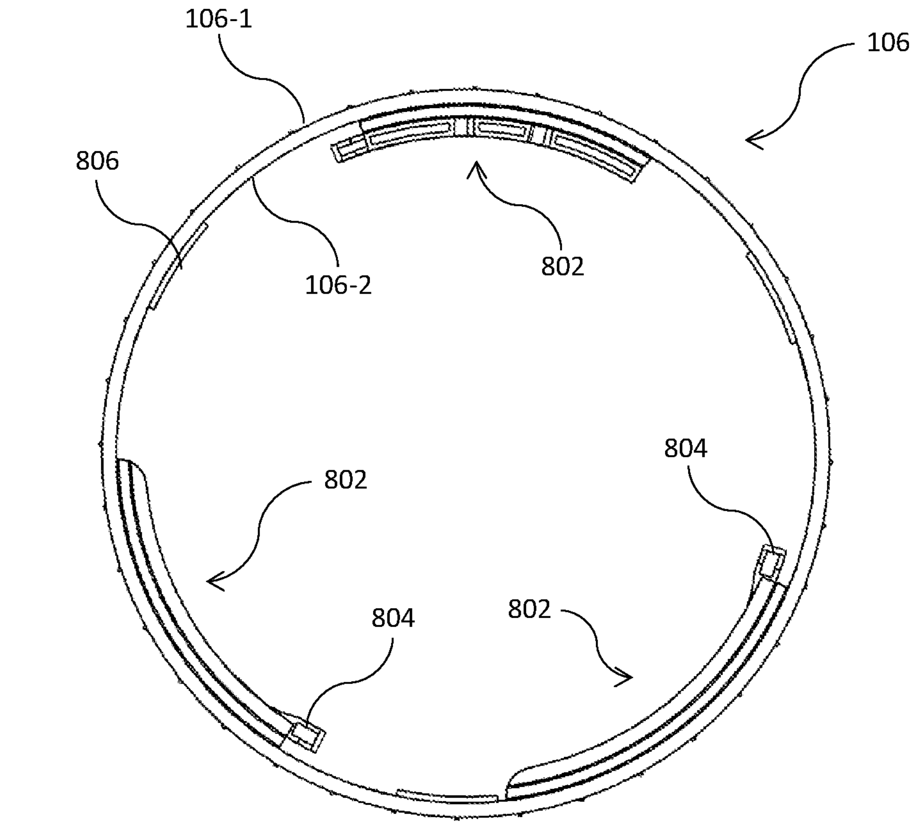
FIGS. 8*c* and 8*d* illustrate a planar view and a sectional view, respectively, of the rotatable ring, according to one or more embodiments of the disclosure.
Figure 8D:
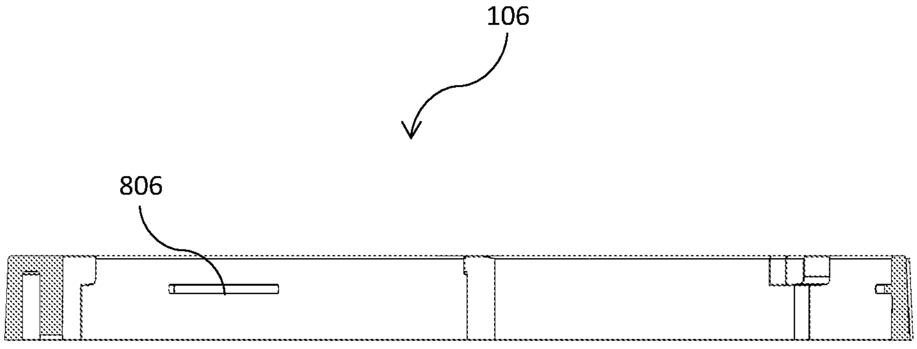

FIGS. 8*a* and 8*b* illustrate different isometric views of the rotatable ring 106, according to one or more embodiments of the disclosure. FIGS. 8*c* and 8*d* illustrate a planar view and a sectional view, respectively, of the rotatable ring 106, according to one or more embodiments of the disclosure. Referring to FIGS. 8*a*-8*d*, the rotatable ring 106 may be disposed on the outer periphery wall 504 of the base member 104. In one or more embodiments, the rotatable ring 106 may be adapted to be rotated in one of the clockwise direction and the anti-clockwise direction with respect to the base member 104 and the cover member 102. The rotatable ring 106 may be adapted to lock the cover member 102 with respect to the base member 104 based on the rotation of the rotatable ring 106.

In the illustrated embodiment, the rotatable ring 106 may include an outer circumferential surface 106-1 and an inner circumferential surface 106-2. The outer circumferential surface 106-1 may be provided with a plurality of gripping protrusions 106-3 to provide a grip to a user while rotating the rotatable ring 106. Further, the inner circumferential surface 106-2 may be adapted to be movably engaged with the outer circumferential surface 504-2 of the outer peripheral wall 504 of the base member 104. In the illustrated embodiment, the rotatable ring 106 may include a plurality of tabs 806 protruding from the inner circumferential surface 106-2. The plurality of tabs 806 may be adapted to be engaged with the plurality of slits 514 formed on the outer circumferential surface 504-2 of the base member 104. The plurality of tabs 806 may be adapted to move within the plurality of slits 514 to allow the rotation of the rotatable ring 106 with respect to the base member 104.

In the illustrated embodiment, the rotatable ring 106 may include, but is not limited to, a plurality of supporting portions 802 and a plurality of engaging portions 804. Each of the plurality of supporting portions 802 may be adapted to support at least one of the plurality of shorting elements 304. In one embodiment, the plurality of shorting elements 304 may be attached to the plurality of supporting portions 802 via an insert moulding process as known in the art. In one or more embodiments, the plurality of shorting elements 304 may be attached to the plurality of supporting portions 802 via any mechanical attachment, such as fasteners, known in the art, without departing from the scope of the disclosure. In one or more embodiments, each of the plurality of supporting portions 802 may include, but is not limited to, a first wall 802-1 and a second wall 802-2. The first wall 802-1 may extend orthogonally from the inner circumferential surface 106-2 of the rotatable ring 106. Further, the second wall 802-2 may extend orthogonally from the first wall 802-1 and be adapted to support one of the plurality of shorting elements 304. A gap 'G' may be defined between the second wall 802-2 and the inner circumferential surface 106-2 of the rotatable ring 106. The gap 'G' may be adapted to receive at least a portion of the outer peripheral wall 504 of the base member 104.

Further, the plurality of engaging portions 804 of the rotatable ring 106 may extend laterally from the plurality of supporting portions 802. The plurality of engaging portions 804 may be adapted to be engaged with the plurality of locking slots 206 to lock the cover member 102 with respect to the base member 104 based on the rotation of the rotatable ring 106. When the rotatable ring 106 is rotated in one of the clockwise direction and the anti-clockwise direction, then the plurality of engaging portions 804 may slide within the plurality of locking slots 206 to lock a relative movement between the cover member 102 and the base member 104. In particular, the engagement between the plurality of engaging portions 804 and the plurality of locking slots 206 may restrict the removal of the cover member 102 from the base member 104 of the detection device 100.

The rotatable ring 106 may be rotated between one of a first position and a second position opposite to the first position, when the plurality of pins 202 forms the electrical contact with the plurality of electrical terminals 302. In one embodiment, the rotatable ring 106 may be rotated in the clockwise direction to move the rotatable ring 106 to the first position and, in the anti-clockwise direction to move the rotatable ring 106 to the second position. In another embodiment, the rotatable ring 106 may be rotated in the anti-clockwise direction to move the rotatable ring 106 to the first position and, in the clockwise direction to move the rotatable ring 106 to the second position.

In the first position, the plurality of engaging portions 804 may lock the cover member 102 with respect to the base member 104 and, the contact strip 704-1 of each of the plurality of electrical terminals 302 moves away from each of the plurality of shorting elements 304 to the break the shorting contact between the plurality of electrical terminal 302 and the plurality of shorting elements 304. Further, in the second position, the contact strip 704-1 may move towards each of the plurality of shorting elements 304 to form the shorting contact between the plurality of electrical terminals 302 and the plurality of shorting elements 304, and unlock the cover member 102 with respect to the base member 104 to remove the plurality of pins 202 from the pair of clamps 706-1 of the plurality of electrical terminals 302.

Figure 9A:
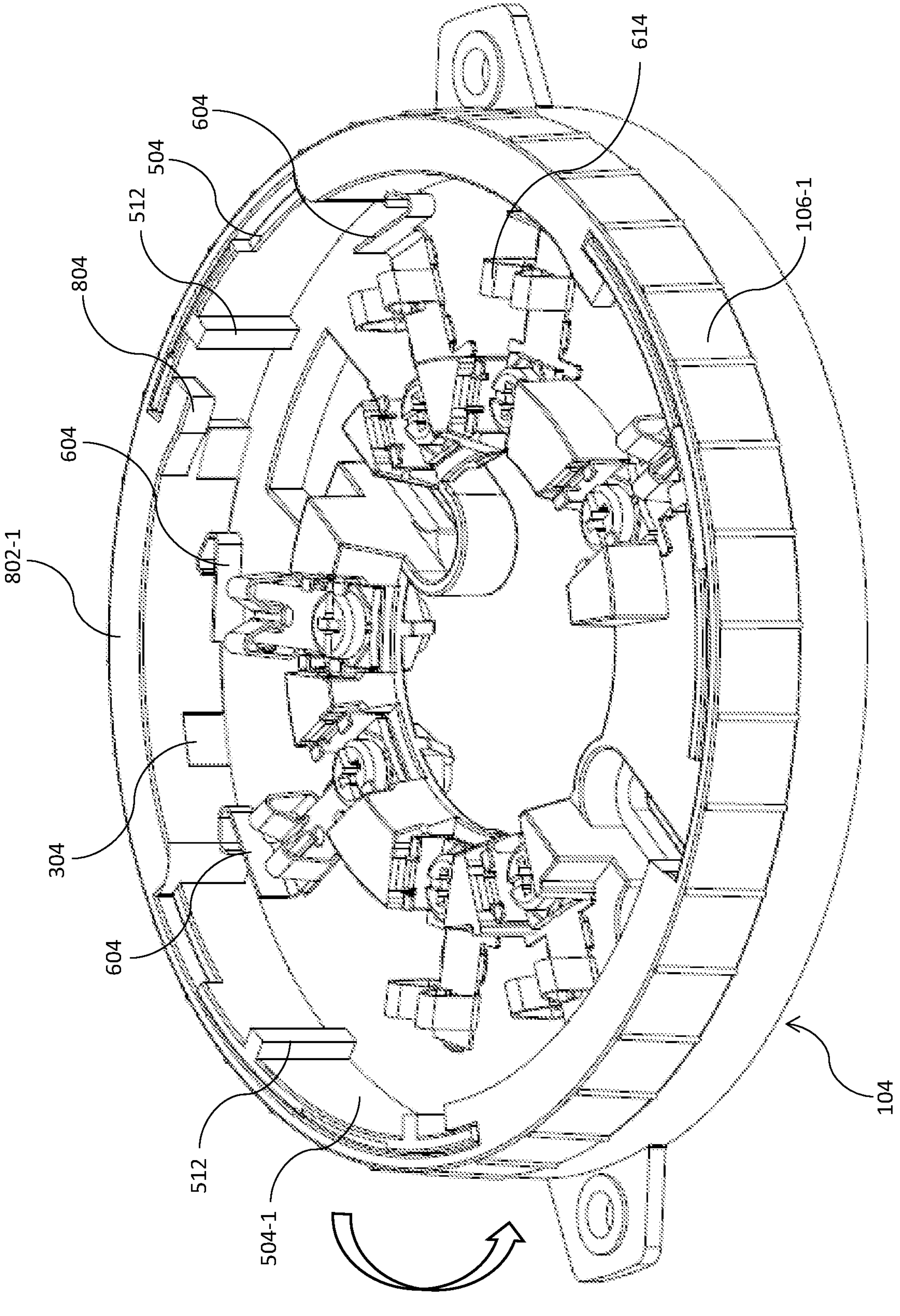
FIGS. 9*a* and 9*b* illustrate partial isometric views of the detection device depicting the rotation of the rotatable ring with respect to the cover member of the detection device, according to one or more embodiments of the disclosure.
Figure 9B:
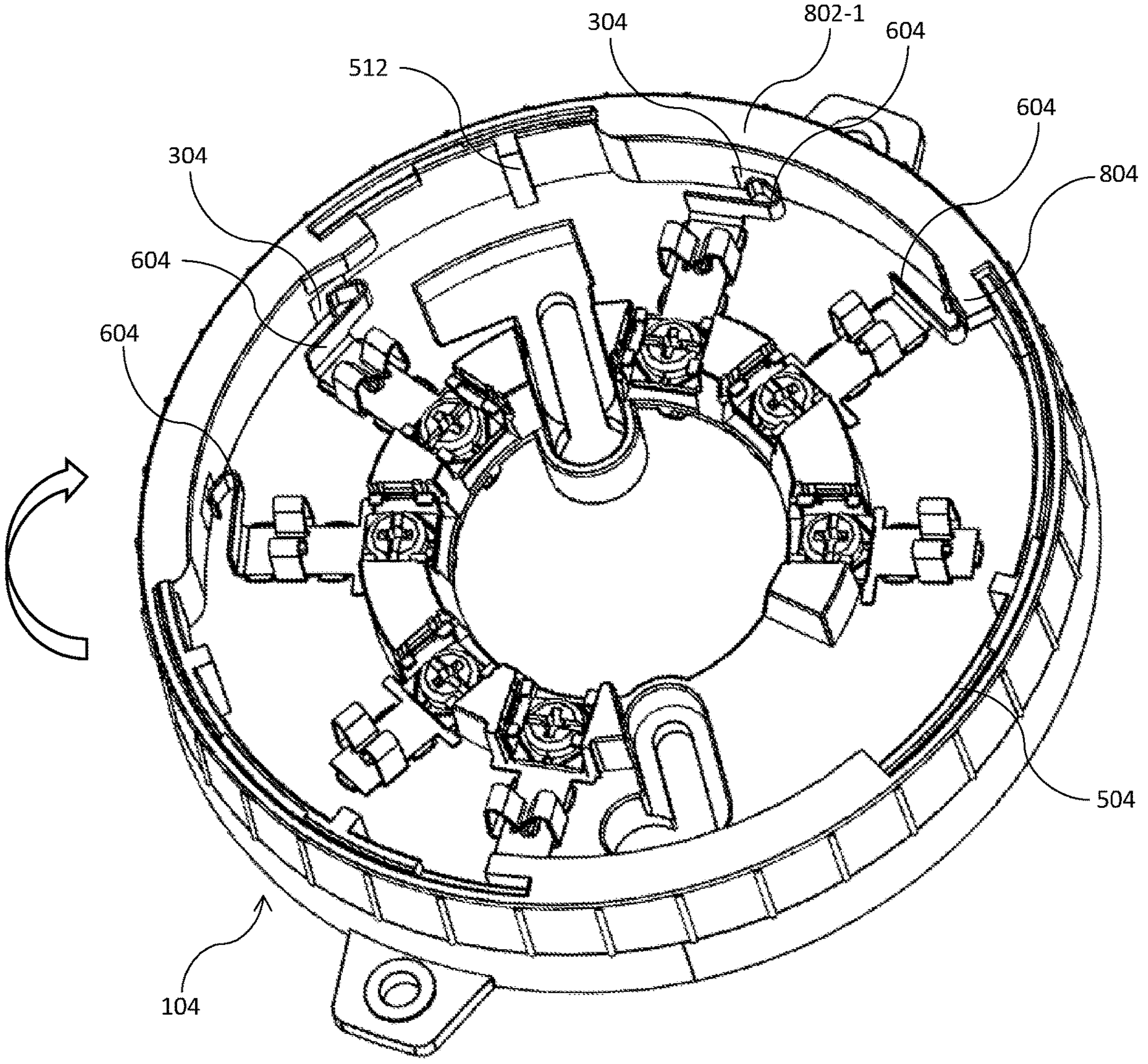

FIGS. **9*a* and 9*b* illustrate partial isometric views of the detection device 100 depicting the rotation of the rotatable ring 106 with respect to the cover member 102 of the detection device 100, according to one or more embodiments of the disclosure. Referring to FIG. 9*a*, the rotatable ring 106 may be at the first position with respect to the cover member 102 and the base member 104 of the detection device 100**.

In the illustrated embodiment, the cover member 102 may be coupled to the base member 104 to engage the plurality of pins 202 with the plurality of electrical terminals 302. Further, the contact portion 604 of each of the plurality of electrical terminals 302 may be positioned away from each of the plurality of shorting elements 304 disposed on the supporting portion 802 of the rotatable ring 106. Thereby, the electrical connection between the detection assembly and the centralized control unit of the fire safety system may be established via electrical contact between the plurality of pins and the electrical terminals.

Further, in the first position of the rotatable ring 106, the plurality of engaging portions 804 may rest within the plurality of locking slots 206 of the cover member 102 to lock the cover member 102 with respect to the base member 104. As explained earlier, the rotatable ring 106 may be rotatably engaged and disposed on the outer peripheral wall 504 of the base member. Further, in the first position, the plurality of engaging portions 804 may be engaged with the plurality of locking slots 206 of the cover member. The rotatable ring 106 may restrict the movement of the cover member 102 with respect to the base member and thereby, restrict the removal of the cover member from the base member. In particular, the rotatable ring 106 may be rotated, to the first position, with respect to the base member 104 and the cover member 102 to lock the cover member 102 with respect to the base member 104 and to break the shorting contact between the plurality of electrical terminals 302 and the plurality of shorting elements 304.

In one or more embodiments, if the detection assembly is expected to be electrically isolated from the centralized control unit, then the rotatable ring 106 may be rotated to the second position. Referring to FIG. **9*b*, the rotatable ring 106 may be at the second position with respect to the cover member 102 and the base member 104 of the detection device 100. In the illustrated embodiment, the cover member 102 may be coupled to the base member 104 to engage the plurality of pins 202 with the plurality of electrical terminals 302. Further, owing to the rotation of the rotatable ring to the second position, the contact portion 604 of the each of the plurality of electrical terminals 302 may form the shorting contact with each of the plurality of shorting elements 304. Thereby, the detection assembly of the detection device 100** may be electrically isolated from the centralized control unit of the fire safety system.

Further, in the second position of the rotatable ring 106, the plurality of engaging portions 804 may slide away from the plurality of locking slots 206 of the cover member 102 to unlock the cover member 102 with respect to the base member 104. In the second position, the plurality of engaging portions 804 may disengage from the plurality of locking slots 206 of the cover member 102. The rotatable ring 106 may allow the movement of the cover member 102 with respect to the base member 104, thereby allowing the removal of the cover member 102 from the base member 104.

Owing to the removal of the cover member 102 from the base member 104, the plurality of pins 202 may be released from the pair of clamps 614 of the plurality of electrical terminals 302. This results in an electrical disconnection between the detection device 100 and the centralized control unit. In particular, the rotatable ring 106 may be rotated, to the second position, with respect to the base member 104 and the cover member 102 to unlock the cover member 102 with respect to the base member 104 and to form the shorting contact between the plurality of electrical terminals 302 and the plurality of shorting elements 304.

As would be gathered, the disclosure offers the detection device 100 for the fire safety system. As explained earlier, the detection device 100 may include the rotatable ring 106 adapted to be rotated with respect to the base member 104 and the cover member 102 of the detection device 100. Based on the rotation of the rotatable ring 106, the detection device 100 may be electrically isolated from the centralized control panel of the fire safety system. Further, based on the rotation of the rotatable ring 106, the cover member 102 with the detection assembly may be locked or unlocked with respect to the base member 104 of the detection device 100. Compared to the existing detection devices, the detection device 100 eliminates the requirement of combining a switching action of a closed continuity switch with an electrical connection of the detector assembly. For instance, in the detection device 100, the detector assembly is electrically connected, and thereafter the rotatable ring 106 is rotated to break or form the shorting contact for electrically connecting or isolating the detector assembly.

As mentioned earlier, the rotatable ring 106 may be rotated to the first position to lock the cover member 102 with the base member 104 and simultaneously, break the shorting contact between the electrical terminals 302 and the shorting elements 304 to electrically connect the detector assembly of the detection device 100 to the centralized control panel. Therefore, in order to electrically connect the detection device 100, firstly, the plurality of pins 202 of the detector assembly may be engaged with the plurality of electrical terminals 302. Secondly, the rotatable ring 106 may be rotated to break the shorting contact between the electrical terminals 302 and the shorting elements 304 to electrically connect the detector assembly of the detection device 100 to the centralized control panel.

Similarly, the rotatable ring 106 may be rotated to the second position to unlock the cover member 102 with the base member 104 and simultaneously, form the shorting contact between the electrical terminals 302 and the shorting elements 304 to electrically isolate the detector assembly of the detection device 100 to the centralized control panel. Therefore, in order to electrically isolate the detection device 100, firstly, the rotatable ring 106 may be rotated to break the shorting contact between the electrical terminals 302 and the shorting elements 304. Secondly, the plurality of pins 202 of the detector assembly may be disengaged with the plurality of electrical terminals 302. By separating the action of electrical isolation and connection of the detector assembly, the overall construction of the detection device 100 is simplified and renders the requirements of tight tolerances to create a reliable design of the detection device 100.

Further, as explained earlier, the rotation of the rotatable ring 106 may lock or unlock the cover member 102 with respect to the base member 104. This substantially simplifies the process of detaching or attaching the detector assembly from the base member 104 of the detection device 100. Further, this ensures that the cover member 102 is unlocked from the base member 104 when the shorting contact is formed between the electrical terminals 302 and the shorting elements 304. Therefore, the detection device 100 of the disclosure is compact, efficient, durable, flexible in implementation, cost-effective, light-weight, and convenient.

While specific language has been used to describe the subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A detection device comprising:
- a cover member defining a housing adapted to support a detector assembly having a plurality of pins;
- a base member coupled to the cover member and adapted to accommodate a plurality of electrical terminals adapted to be engaged with the plurality of pins to form an electrical contact;
- a rotatable ring disposed on an outer periphery of the base member and adapted to lock the cover member with respect to the base member based on a rotation of the rotatable ring; and
- a plurality of shorting elements disposed on the rotatable ring and adapted to form a shorting contact with the plurality of electrical terminals based on the rotation of the rotatable ring,
- wherein the rotatable ring is rotated with respect to the base member and the cover member to at least one of:
  - lock the cover member with respect to the base member and break the shorting contact between the plurality of electrical terminals and the plurality of shorting elements, and
  - unlock the cover member with respect to the base member and form the shorting contact between the plurality of electrical terminals and the plurality of shorting elements.

2. The detection device according to claim 1, wherein the cover member comprises a peripheral wall vertically extending from a bottom surface of the cover member and adapted to be engaged with the rotatable ring.

3. The detection device according to claim 1, wherein each of the plurality of pins extends through a bottom surface of the cover member.

4. The detection device according to claim 2, wherein the peripheral wall comprises:
- a plurality of locking slots adapted to be engaged with the rotatable ring based on the rotation of the rotatable ring.

5. The detection device according to claim 2, wherein the peripheral wall comprises:
- a plurality of guiding slots adapted to receive a plurality of protrusions formed on an inner circumferential surface of the base member.

6. The detection device according to claim 1, wherein the rotatable ring comprises:
- a plurality of supporting portions; and
- a plurality of engaging portions extending laterally from the plurality of supporting portions, wherein the plurality of engaging portions is adapted to be engaged with a plurality of locking slots to lock the cover member with respect to the base member based on the rotation of the rotatable ring.

7. The detection device according to claim 6, wherein each of the plurality of supporting portions is adapted to support at least one of the plurality of shorting elements.

8. The detection device according to claim 6, wherein each of the plurality of supporting portions comprises:
- a first wall extending orthogonally from an inner circumferential surface of the rotatable ring; and
- a second wall extending orthogonally from the first wall and adapted to support one of the plurality of shorting elements,
- wherein a gap is defined between the second wall and the inner circumferential surface of the rotatable ring, and is adapted to receive at least a portion of the outer periphery of the base member.

9. The detection device according to claim 6, wherein the rotatable ring comprises a plurality of tabs protruding from an inner circumferential surface and adapted to be engaged with a plurality of slits formed on the outer periphery of the base member.

10. The detection device according to claim 6, wherein each of the plurality of engaging portions extends laterally from a first wall and a second wall of each supporting portion.

11. The detection device according to claim 1, wherein the base member comprises a plurality of mounting portions circumferentially distributed around a central opening of the base member, each of the plurality of mounting portions is adapted to accommodate at least one of the plurality of electrical terminals.

12. The detection device according to claim 1, wherein each of the plurality of electrical terminals comprises:
- a supporting portion adapted to be fastened to one of a plurality of mounting portions of the base member;
- a contact portion distal to the supporting portion and adapted to form the shorting contact with one of the plurality of shorting elements; and an intermediate portion disposed between the supporting portion and the contact portion, the intermediate portion is adapted to be engaged with one of the plurality of pins.

13. The detection device according to claim 12, wherein the contact portion comprises a contact strip adapted to resiliently move to form the shorting contact with one of the plurality of shorting elements.

14. The detection device according to claim 12, wherein the intermediate portion comprises a pair of clamps adapted to resiliently expand with respect to each other to hold one of the plurality of pins therebetween.

15. The detection device according to claim 1, wherein the rotatable ring is rotated between one of a first position and a second position opposite to the first position, when the plurality of pins forms the electrical contact with the plurality of electrical terminals.

16. The detection device according to claim 15, wherein:

in the first position, the plurality of engaging portions locks the cover member with respect to the base member and, the contact strip of each of the plurality of electrical terminals moves away from each of the plurality of shorting elements to the break the shorting contact between the plurality of electrical terminal and the plurality of shorting elements, and in the second position, the contact strip moves toward each of the plurality of shorting elements to form the shorting contact between the plurality of electrical terminal and the plurality of shorting elements, and unlocking the cover member with respect to the base member to remove the plurality of pins from the pair of clamps of the plurality of electrical terminals.

17. A rotatable ring for a detection device, comprising:

a body having an inner circumferential surface and an outer circumferential surface adapted to be coincide with an outer periphery of a base member of the detection device;

a plurality of supporting portions formed on the inner circumferential surface of the body and adapted to support a plurality of shorting elements; and a plurality of engaging portions extending laterally from one of the plurality of supporting portions, the plurality of engaging portions adapted to be engaged with a cover member of the detection device to lock the cover member with respect to the base member, wherein the rotatable ring is rotated with respect to the base member and the cover member to at least one of:

lock the cover member with respect to the base member and break a shorting contact between the plurality of shorting elements and a plurality of electrical terminals positioned on the base member, and unlock the cover member with respect to the base member and form the shorting contact between the plurality of electrical terminals and the plurality of shorting elements.

18. The rotatable ring according to claim 17, comprising:

a plurality of supporting portions; and a plurality of engaging portions extending laterally from one of the plurality of supporting portions, wherein the plurality of engaging portions is adapted to be engaged with a plurality of locking slots of the cover member to lock the cover member with respect to the base member based on the rotation of the rotatable ring.

19. The rotatable ring according to claim 18, wherein each of the plurality of supporting portions is adapted to support at least one of the plurality of shorting elements.

20. The rotatable ring according to claim 18, wherein each of the plurality of supporting portions comprises:

a first wall extending orthogonally from the inner circumferential surface of the rotatable ring; and a second wall extending orthogonally from the first wall and adapted to support one of the plurality of shorting elements, wherein a gap is defined between the second wall and the inner circumferential surface, the gap is adapted to receive at least a portion of the outer periphery of the base member.

* * * * *